US005123724A

United States Patent [19]

Salk

[11] Patent Number: 5,123,724
[45] Date of Patent: Jun. 23, 1992

[54] CUSTOMIZED CLIP-ON EYEGLASS ACCESSORY AND METHOD OF MANUFACTURE

[76] Inventor: David E. Salk, 2638 Ashby Ave., Berkeley, Calif. 94705

[21] Appl. No.: 636,183

[22] Filed: Dec. 31, 1990

[51] Int. Cl.⁵ .......................... G02C 9/00; G02C 7/08
[52] U.S. Cl. .......................................... 351/57; 351/47
[58] Field of Search ................ 357/47, 48, 57, 58, 357/52, 140, 154, 124

[56] References Cited

U.S. PATENT DOCUMENTS

| | | |
|---|---|---|
| 2,065,458 | 12/1936 | Hines ................................ 351/57 |
| 2,132,346 | 10/1938 | Richards . |
| 2,159,710 | 5/1939 | Reichert . |
| 2,511,776 | 6/1950 | Kelly . |
| 2,770,167 | 11/1956 | Passet . |
| 4,119,369 | 10/1978 | Eloranta et al. . |
| 4,154,513 | 5/1979 | Goulden . |
| 4,659,196 | 4/1987 | Gazeley . |
| 4,890,910 | 1/1990 | Gazeley . |

Primary Examiner—Rodney B. Bovernick
Attorney, Agent, or Firm—Harris Zimmerman

[57] ABSTRACT

A clip-on accessory for positioning auxiliary optical elements in front of the lenses of eyeglass can be easily assembled to custon fit eyeglasses having any of a variety of different sizes and configurations. An outline of the lens regions of the particular pair of eyeglasses is prepared and two initially oversized optical elements are trimmed to conform with the outline. Upper and lower eyeglass engaging claps are secured to each element and ends of a resilient bridge member are inserted into passages in each upper clasp. At least one upper clasp and the optical element to which it is fastened is slid along the bridge member to space the elements apart a distance corresponding to the spacing of the eyeglass lens regions. The upper clasps are then secured to the bridge member and end portions of the bridge member that protrude from the upper claps are cut off.

15 Claims, 3 Drawing Sheets

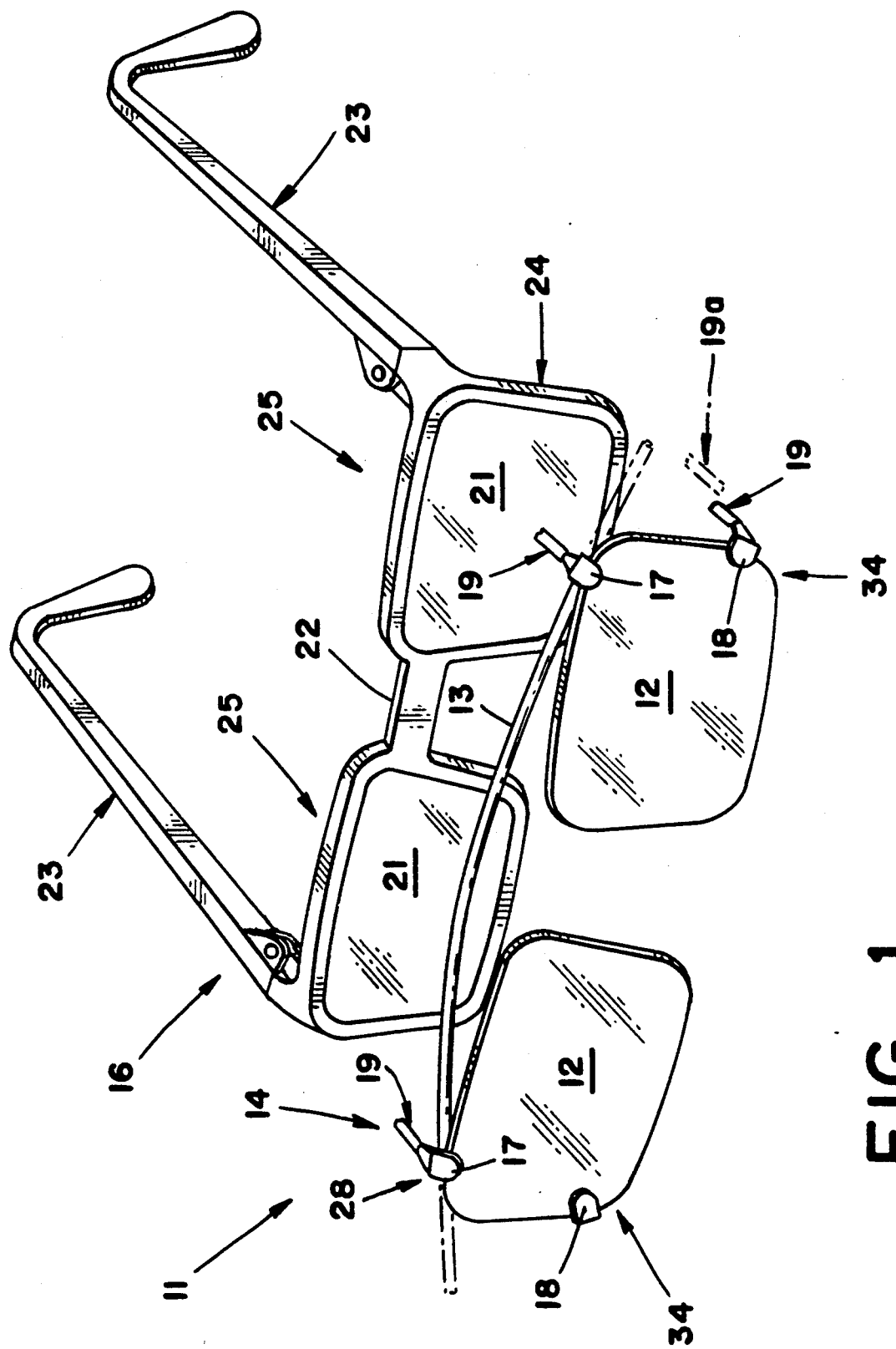
FIG_1

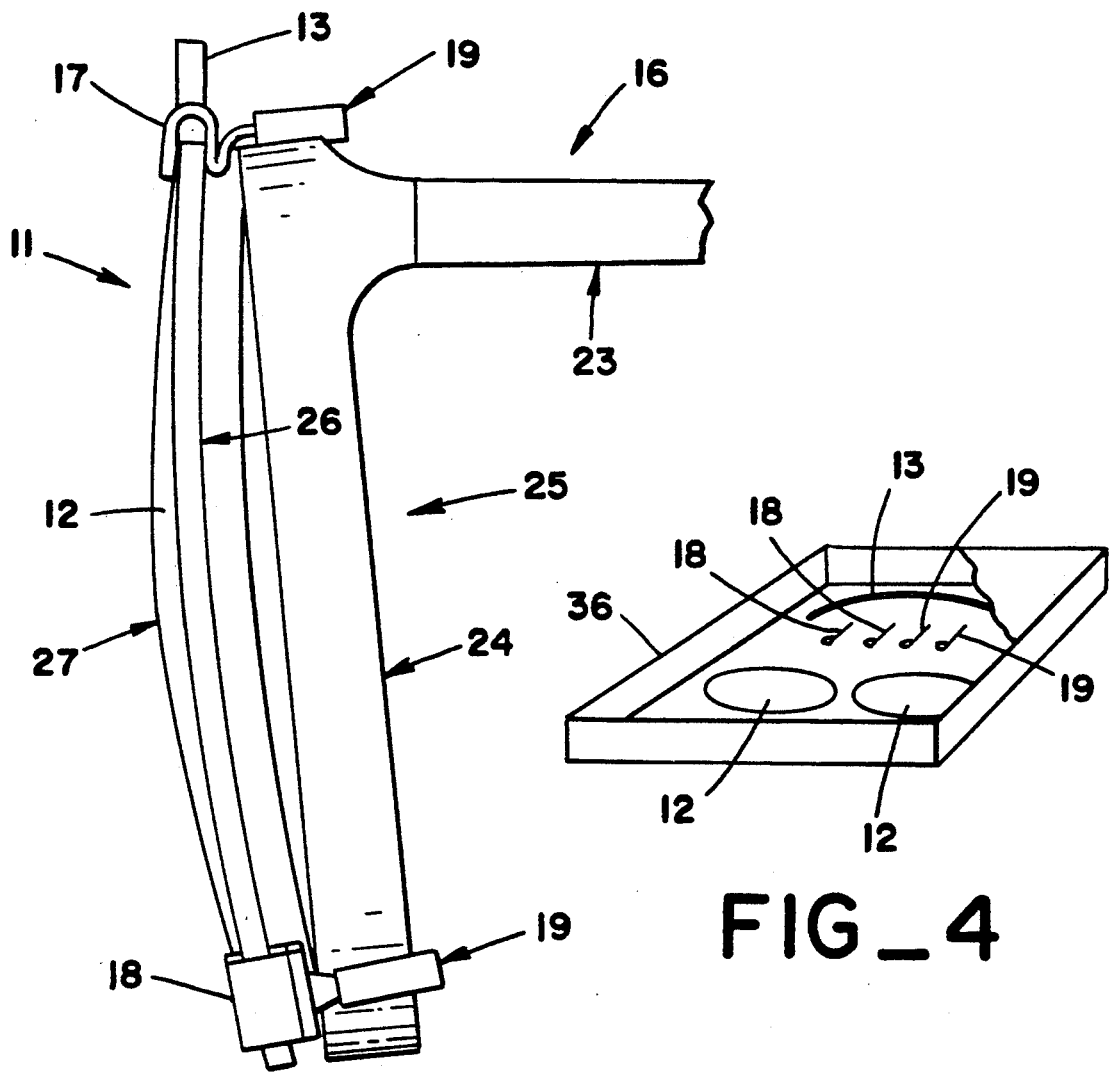
FIG_2
FIG_4
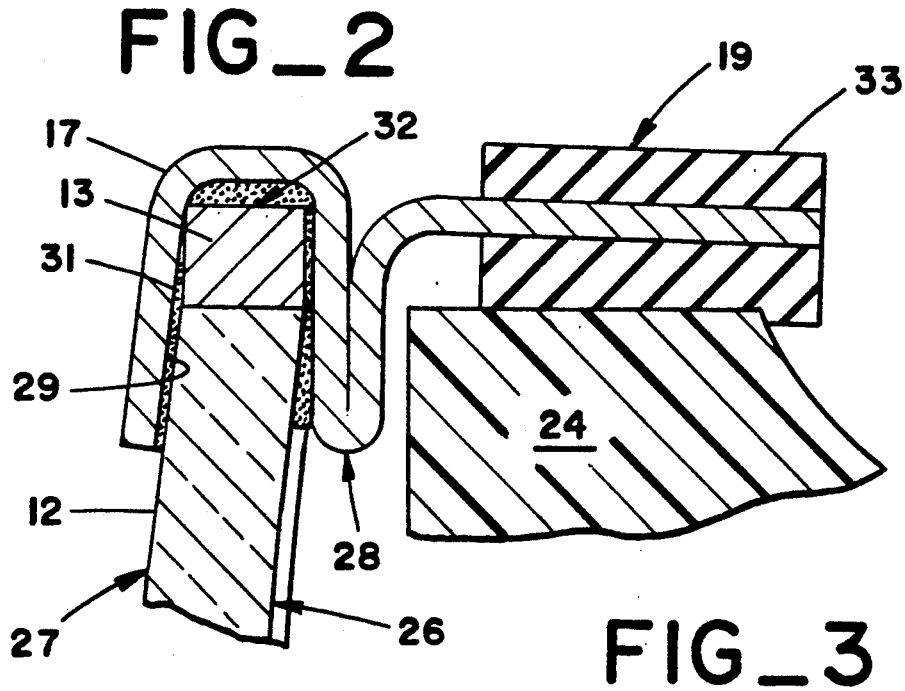
FIG_3

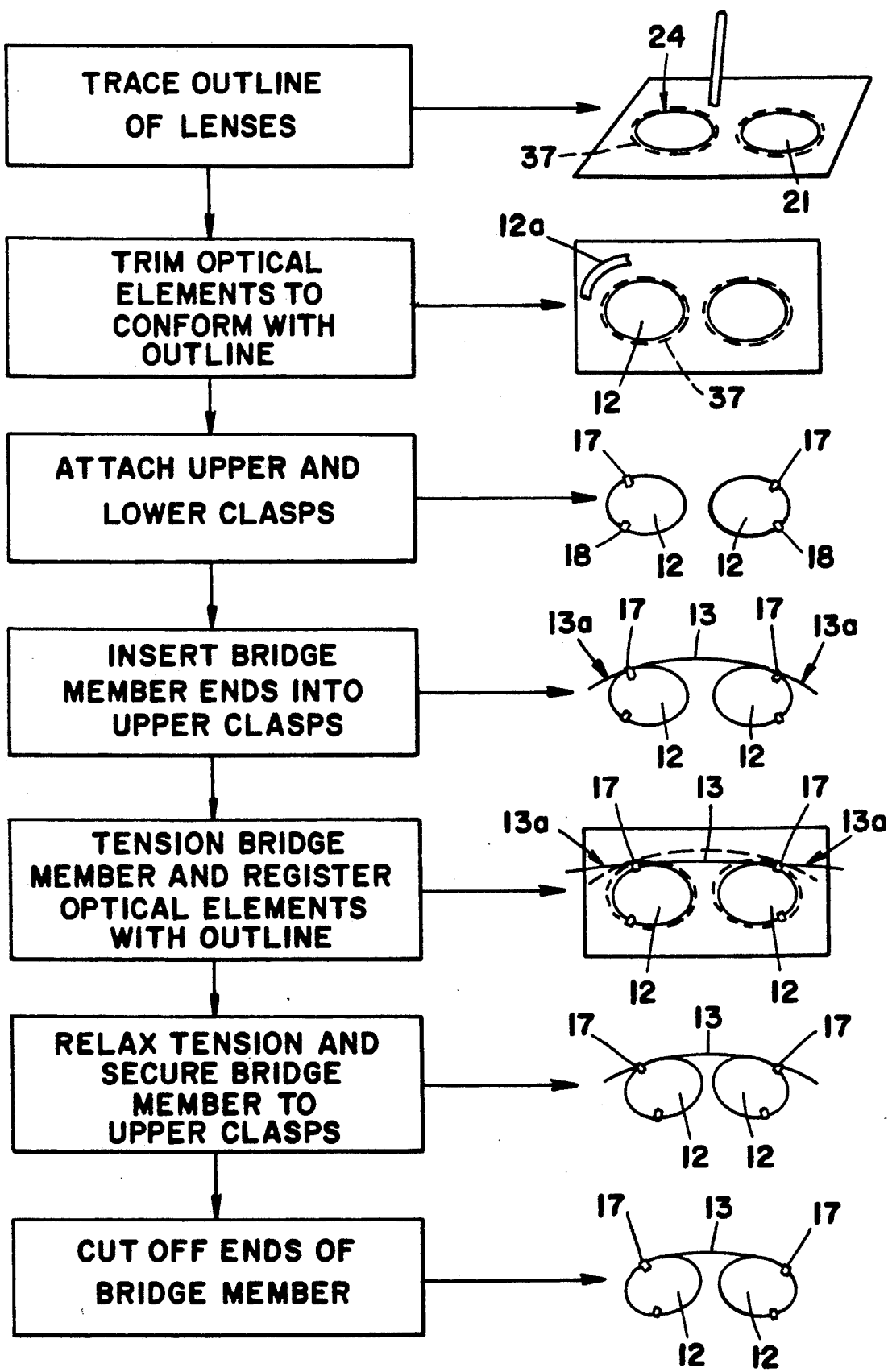
FIG_5

CUSTOMIZED CLIP-ON EYEGLASS ACCESSORY AND METHOD OF MANUFACTURE

TECHNICAL FIELD

This invention relates to attachments for eyeglasses and more particularly to clip-on attachments that superimpose auxiliary optical elements in front of the lenses of eyeglasses.

BACKGROUND OF THE INVENTION

The optical properties of a particular pair of eyeglasses are fixed at the time of manufacture. The needs of the owner of the eyeglasses with respect to vision correction or vision modification vary under different conditions. For example, reduction of light intensity as provided by sunglasses is desirable at certain times and locations but not at others. In some situations, such as where a person is operating a computer, a temporary increase in magnification can be helpful. Wearing of yellow tinted glasses can aid night vision but this may not be desirable during the daytime or in the presence of indoor lighting.

Obtaining two or more pairs of eyeglasses for use under different conditions is costly particularly in the case of prescription eyeglasses that are fabricated to meet the specialized needs of the particular person. It is simpler and more economical to make use of attachments of the type that can be temporarily clipped onto the person's basic vision correcting eyeglasses at times when reduced light intensity or some other vision modification is needed.

Prior clip-on eyeglass accessories of this kind have not been entirely satisfactory for several reasons.

For example, eyeglasses are made in a variety of sizes and a variety of configurations. Further, the configuration of eyeglasses tends to vary from time to time because of changes in fashion or for other reasons. Many prior clip-on accessories are mass produced in one size and shape or a limited number of sizes and shapes. Consequently the optical elements of such accessories often do not have the same configuration and spacing as the lenses of the eyeglasses with which they are used. This discomformity can cause several problems. Undersized optical elements and optical elements that are out of register with the eyeglass lenses tend to disrupt the wearer's field of view and also present an unesthetic appearance to others. Oversized optical elements may contact the wearer's skin in an irritating manner and have projecting edges that may promote dislodgement of the accessory from the eyeglasses.

In order to alleviate these problems, some manufacturers of eyeglass frames provide clip-on sunglass accessories having optical elements that conform with the lenses and lens spacings of a particular frame. Prior conforming clip-on accessories of this kind are largely limited to use with the specific frame configuration for which the accessory was designed or at best are suitable for use with a limited number of frames that have closely similar configurations. Dispensing opticians typically offer a variety of different frame styles and stocking of a corresponding large inventory of different clip-on accessories is costly and an operational complication. As a practical matter, such conformed clip-on accessories may not be available for many models of eyeglass frame.

The prior conformed clip-on accessories also have a costly construction which relies on rims on the optical elements to interconnect and secure the other components of the accessory such as a bridge member and clasps for engaging the eyeglasses.

The present invention is directed to overcoming one or more of the problems discussed above.

SUMMARY OF THE INVENTION

In one aspect, the present invention provides a customized clip-on accessory for superimposing auxiliary optical elements on the lenses of a particular pair of eyeglasses. The accessory has a pair of auxiliary optical elements which are trimmed to have perimeters that conform substantially with the lens regions of the particular pair of eyeglasses and a bridge member which extends between the pair of optical elements. The bridge member has a length selected to maintain the optical elements in register with the lens regions of the eyegalsses. First and second clasps are secured the edges of separate ones of the optical elements and are also secured to the bridge member. At least one of the clasps includes means for enabling securing of the clasp at a selected location along the bridge member during assembly of the accessory.

In another aspect, the invention provides a clip-on accessory for holding auxiliary optical elements in front of the lenses of a pair of eyeglasses which accessory is customized to conform with a specific pair eyeglasses of predetermined configuration. The accessory includes a pair of optical elements each of which is superimposable on a separate one of the eyeglass lenses and each of which is trimmed to conform substantially with the lens regions of the eyeglases. A resilient bridge member extends between the optical elements and has opposite ends which extend into transverse passages in a pair of upper clasps and which are secured to the clasps. Each upper clasp is also secured to the upper edge of a separate one of the optical elements and each has a rearwardly extending eyeglass engaging pin. The bridge member has a length that is adjusted during assembly of the accessory to position the optical elements in register with the lens regions of the particular pair of eyeglasses. A pair of lower clasps are each secured to a separate one of the optical elements at locations below the locations of the upper clasps and each also has a rearwardly extending eyeglass engaging pin.

In still another aspect, the invention provides a method of custom fabricationg a clip-on accessory for engagement on a particular pair of eyeglasses using components that are initially adaptable to a variety of different eyeglass configurations. Steps in the method include preparing an outline of the lens regions of the particular pair of eyeglasses and conforming a pair of auxiliary optical elements with the outline by trimming marginal regions away from a pair of the elements that are initially of greater extent than the lens regions. A separate one of a pair of eyeglass engaging clasps is secured to the upper edge of each optical element and a bridge member is extended between the two clasps and secured to the clasps. Prior to the securing of at least one of the clasps to the bridge member at least the one clasp is slid along the bridge member to establish a spacing of the optical elements that corresponds to the spacing of the lenses of the particular pair of eyeglasses.

In a further aspect, the invention provides a kit for enabling assembly of a clip-on accessory that is custom fitted to a specific pair of eyeglasses. The kit includes a pair of auxiliary optical elements for disposition in front of the lens regions of the eyeglasses which optical elements are each of greater size than the eyeglass lens regions and a bridge member having a length sufficient to enable variation of the spacing of said optical elements to accommodate to eyeglasses of different sizes and configurations. The kit further includes at least four clasps adapted for engagement on edge regions of said optical elements which clasps include means for gripping said eyeglasses. At least one of the clasps has a passage which extends completely therethrough and which is of sufficient size to receive the bridge member and to enable sliding of the clasp along the bridge member during assembly of the accessory.

The invention provides a customized clip-on eyeglass accessory that can be easily and economically assembled into any of a variety of sizes and configurations, to conform with eyeglasses of diverse different shapes, using the same set of starting components. The starting components can, if desired, be packaged in a kit to facilitate the fabrication of customized clip-on accessories by dispensing opticians or others. In the preferred form, the accessory snaps onto and securely grips the eyeglasses and is held in precise registration with the eyeglass lenses by clasps which also function to secure the optical elements and a bridge member together. Structural integrity is not dependent on rims and the accessory can have an inexpensive construction. In the preferred form, components can be easily disassembled and at least in part can be reused to form an accessory of different configuration when the owner acquires new eyeglasses.

The invention, together with further aspects and advantages thereof, may be further understood by reference to the following description of the preferred embodiment and by reference to the accompanying drawings.

BRIEF DESCRIPTION OF THE DRAWINGS

FIG. 1 is a perspective view of a pair of eyeglasses and a clip-on accessory as customized for use with the particular pair of eyeglasses, the accessory being shown detached from the eyeglasses.

FIG. 2 is a side elevation view of the forward region of the apparatus of FIG. 1 with the clip-on accessory being shown engaged on the eyeglasses.

FIG. 3 is a section view of a eyeglass gripping clasp component of the apparatus of the preceding figures.

FIG. 4 is a diagramatic view of a kit of components for use in fabrication of the clip-on accessory.

FIG. 5 is a diagramatic illustration of successive steps in a method for fabricating the clip-on accessory of the preceding figures.

DETAILED DESCRIPTION OF THE PREFERRED EMBODIMENT

Referring initially to FIG. 1 of the drawings, the clip-on eyeglass accessory 11 of this particular example of the invention is a sunglass accessory and thus spaced apart optical elements 12 which are of the light reducing type. The optical elements 12 may serve other purposes, examples of which have been previously described, and thus are not necessarily of the light reducing type in all embodiments of the invention.

Optical elements 12 are interconnected by a bridge member 13 which extends between the upper edge regions of the elements. Means 14 are provided for fastening the accessory 11 to the front of a pair of eyeglasses 16 and in the preferred form of the invention such means includes an upper pair of clasps 17 and a lower pair of clasps 18. Clasps 17 and 18 are fastened to the edges of optical elements 12 and each clasp has a rearwardly extending eyeglass engaging pin 19.

The eyeglasses 16 with which the accessory 11 is used may be of any of the conventional constructions and thus typically includes a pair of spaced apart vision correcting lenses 21, interconnected by a frame member 22, and pivotable temple members 23 which extend rearwardly at opposite sides of the eyeglasses. The particular pair of eyeglasses 16 shown in the drawings for purposes of example has rims 24, integral with frame member 22, that extend around the perimeters of lenses 21 but the accessory 11 is equally compatible with rimless eyeglasses.

Clip-on accessory 11 is fabricated from a group of components, which will hereinafter be described in more detail, that enable the accessory to be customized to eyeglasses 16 of diverse different configurations and sizes. When customized in this manner, the perimeters of the optical elements 12 have outlines conforming to the perimeters of the lens regions 25 of the eyeglasses and a spacing which conforms to the spacing of the lens regions. The means 14 for fastening accessory 11 to eyeglasses 16 acts to hold the optical elments 12 in registration with the eyeglass lenses 21.

Referring jointly to FIGS. 2 and 3, the optical elements 12 are preferably slightly concave at the back 26 and slightly convex at the front 27 to conform with the typical eyeglass lens 21 and to avoid optical distortion although this is not essential in all cases. The elements 12 may be forned of plastic or glass of any of the known types that are used in the manufacture of eyeglass lenses.

Referring jointly to FIGS. 1 and 3, the upper and lower clasps 17 and 18 have the same configuration in this embodiment and each includes a clasp member 28 formed to provide a transverse passage 29 of U-shaped cross section at the forward region of the member which passage extends completely through the clasp member. Passage 29 is proportioned to enable entry of an edge region of one of the optical elements 12 into the passage and to receive a quantity of adhesive 31, such as epoxy for example, to secure the clasp 17 or 18 to the optical element. The passage 29 is further proportioned to enable entry of an end 32 of bridge member 13 into the passages of the two upper clasps 19. Adhesive 31 secures the upper clasps 17 to the bridge member 13 within the passages 29.

The eyeglass engaging pins 19 are rearwardly extending portions of the clasps 17 and 18 each of which is encircled by a small sleeve 33 or rubber or similar material that is secured to the member.

Referring to FIG. 1 in particular, the upper clasps 17 are fastened to the upper edge regions of optical elements 12 and the lower clasps 18 are fastened to side edges of the optical elements at locations which are below those of the upper clasps, the lower clasps being at the rounded outer corners 34 or the bottom region of the elements in this example.

Bridge member 13 is formed of resilient material such as spring steel and preferable is upwardly bowed when in an undistorted condition. Prior to fastening of the accessory 11 onto eyeglasses 16, the resilient bridge member 13 assumes a relaxed or undistorted configuration at which the lower regions of the optical elements 12 including the lower clasps 18 are slightly closer together than is the case when the accessory has been fitted onto the eyeglasses. This provides for ease of installation of the accessory 11 onto eyeglasses 16 and provides for a highly secure gripping of the eyeglasses that resists dislodging of the accessory.

In particular, installation is facilitated in that the upper eyeglass engaging pins 19 may be rested on the tops of the lens rims 24 over each lens 21. Manual depression of the center of bridge member 13 then pivots the lower pair of pins 19 away from each other to the positions indicated by dashed lines 19a in FIG. 1. At these positions 19a, the force that is being exerted on bridge member 13 pivots the lower pins 19 backward alongside the lower outer corners of the lens rim 24. Upon release of the bridge member 13, the resiliency of the member draws all four pins 19 tightly against the lens rim 24 thereby assuring a strong gripping of the eyeglasses 16 by the accessory 11. Detachment of the accessory 11 from eyeglasses 16 is easily accomplished by again depressing the center of bridge member 13 and then moving the accessory 11 in a forward direction.

Referring to FIG. 4, starting components for fabricating a clip-on accessory 11 that is customized to a particular pair of eyeglasses include a bridge member 13, two optical elements 12 and four clasps 18, 19. These components are similar to those previously described except that bridge member 13 is initially longer than is required for the particular eyeglasses and optical elements 12 initially have a greater area or extent than is needed for the particular eyeglasses. Preferably, bridge member 13 is sufficiently long to accommodate to the widest eyeglasses that are manufactured and optical elements 12 are of sufficient size to cover the largest lenses that are used in eyeglasses. Alternately, in the interests of economizing on materials, the bridge members 13 and optical elements 12 may be manufactured and marketed in two or more different sizes.

For the convenience of optical technicians or others who fabricate the clip-on accessory 11, the components needed for construction of a single accessory can be assembled as a kit with the components preferably being enclosed in a container or package 36.

Referring to FIG. 5, steps in the method of fabricating a clip-on accessory from the above described components include preparing an outline 37 which conforms with the optical element shape that is needed to customize the accessory 11 to a particular pair of eyeglasses. Preferably the outline 37 conforms substantially with the perimeters of the lenses 21 although in some cases it may desired to conform the optical elements with the inside or outside perimeters of the lens framing of the pair of eyeglasses.

The lenses 21 may be temporarily removed from the frames in instances where it is desired to conform the perimeters of the optical elements with the perimeters of the lenses. The outlines of the lenses 21 may then be traced onto paper or onto thicker template material or in some cases onto the optical elements themselves depending on the tools that are to be used to trim the elements into their final form. In instances where the manufacturer of the eyeglass frames provides a pattern displaying the configuration of the lenses 21, the pattern may itself provide the outline. The outline 37 may also be prepared by using known pattern making mechanisms which sense the configuration of lens edge receiving grooves in eyeglass frames.

As the lenses 21 of eyeglasses 16 are usually symmetrical, it is possible to use a single outline from one lens 21 that is turned over and reversed from side to side when the optical element corresponding to the other lens is to be trimmed. However, an outline 37 of both lenses 21 that also shows the lens further steps which will be hereinafter described.

Outline 37 may be a tracing prepared from the lens regions of the eyeglass frames, rather than the lenses, if the optical elements 12 are conform with the inside or outside perimeter of the lens framing.

Marginal regions 12 a of the optical elements 12 are then trimmed away to conform the perimeters of the elements with the outline 37. Any of a variety of cutting or grinding tools can be used to trim the elements 12 but preferably the outline 37 is prepared in the form of a template and known automatic tools which cut workpieces into outlines conforming with a template are used to perform the operation.

Upper and lower clasps 17 and 18 are then fastened to the edge regions of the two optical elements 12 at the previously described locations. This is preferably done with epoxy or other adhesive but other forms of engagement may be used such as screws, set screws or the like. The edges of the optical elements 12 are not seated all the way into the top of the internal passages 29 of the upper clasps 17 and the upper regions of such passages are left free of adhesive at this stage. This leaves the upper regions of passages 29 of upper clasps 17 free to receive the bridge member 13.

Following hardening of the adhesive 31, opposite end portions 13a of bridge member 13 are inserted into the passages 29 of the two upper clasps 17. The trimmed optical elements 12, carrying the bridge member 13, are then arranged in a spaced apart relationship corresponding to the spacing of the lens regions of the eyeglasses and in angular orientations similar to those of the lens regions. This can be accomplished by placing elements 12 over the previously traced outline 37 and sliding one or both of the clasps 17 along bridge member 13 to effect the desired spacing. Alternately, this may be accomplished by placing the elements 12 on the eyeglasses themselves and sliding one or both clasps 17 as necessary to bring the elements into register with the eyeglass lenses. This can be accomplished by sliding only one of the clasps 17 if bridge member 13 has a strictly circular curvature. Sliding of both clasps 17 is desirable in instances where the bridge member 13 has a symmetrical but non-circular curvature.

Bridge member 13 is tensioned while the optical elements 12 are held in the above described relationship to each other. In particular, pressure is exerted on the center of the resilient bridge member 13 in a direction which decreases the curvature of the member. This causes a small sliding movement of one or both end portions 13a of the bridge member 13 within the passages 29 of upper clasps 17. The tension in bridge member 13 is then relaxed while taking care to assure that the upper clasps 17 do not undergo any longitudinal movement along the member as relaxation of the member is occurring. As the curvature of bridge member 13 increases as relaxation occurs, the motion of the of the bridge member pivots the two optical elements 12 towards each other and reduces the spacing of the lower pins 19 by a small amount. Adhesive is then introduced into the upper regions of the upper clasp passages 29 to secure the bridge member 13 and clasps 17 to each other or the components are secured together by other means.

After the adhesive has cured, the end portions of bridge member 13 that protrude from clasps 17 at the sides of the eyeglasses 16 are cut off.

The above described steps cause the optical elements 12 to have a closer spacing than the lenses 12 of eyeglasses 16 when the accessory 11 is disengaged from the eyeglasses and the resilient bridge member 13 is in a relaxed condition. Consequently, it is necessary to force the resilient bridge member 13 into a less curved configuration in order to fit the accessory 11 onto the eyeglasses 16. This distortion of the bridge member 13 spreads the lower eyeglass engaging pins 19 and shifts the optical elements 12 back towards the orientations at which they register with the lenses 21 of the eyeglasses 16. The distortion also creates resilient tension in the bridge member 13 that causes the accessory 11 to grip the eyeglasses 16 tightly.

As previously described, distorting of bridge member 13 for the purpose of fitting the clip-on accessory 11 onto eyeglasses glasses 16 is most easily accomplished by resting the upper engaging pins 19 on the tops of the lens rims 24 and momentarily pinching the center of bridge member 13 and center frame member 22 of the eyeglasses 16 with the thumb and forefinger. This causes the lower eyeglasses engaging pins 19 to spread and creates a pivoting force on the accessory 11 that results in a snap action engagement onto the eyeglasses 16.

Optionally, rims or edging simulating rims may be provided on the optical elements 12 for decorative purposes. However, the accessory 11 does not require rims for structural reasons. The upper clasps 17 secure the optical elements 12 and bridge member 13 together and the lower clasps 18 are independently joined to the optical elements.

The above described construction of the clip-on accessory 11 enables disassembly, by dissolving the adhesive with acetone or other appropriate solvent, and reuse of some or all of the components to form a new customized accessory when the owner acquires a new pair of eyeglasses of different configuration. New optical elements 12 may be needed if the lenses of the new eyeglasses are larger than those of the prior eyeglasses but this is often not the case.

While the invention has been described with reference to a single embodiment for purposes of example, many modifications or variations of the accessory and the method of fabricating the accessory are possible and it is not intended to limit the invention except as defined in the following claims.

By way of example, only, the term "conform substantially" as used herein should be understood to embrace optical elements 12 which have substantially the same planar contour as their associated lenses 21, and which preferably have substantially the same size perimeter or pattern, but could also include optical elements 12 which have a somewhat smaller or larger perimeter than the underlying lenses 21.

I claim:

1. In a customized clip-on accessory for superimposing auxiliary optical elements on the lenses of a particular pair of eyeglasses, which eyeglasses have spaced apart first and second lens regions and a frame member extending therebetween, the combination comprising:

first and second auxiliary optical elements which are trimmed to have perimeters that conform substantially with said lens regions of said particular pair of eyeglasses, a bridge member extending between said first and second optical elements and having a length selected to maintain said first and second optical elements in register with said first and second lens regions of said particular pair of eyeglasses, first and second eyeglass securing clasps each being secured to an edge of a separate one of said optical elements and each being directly secured to said bridge member, said first and second clasps being situated at spaced apart locations along said bridge member, at least one of said clasps having means for enabling securing of the clasps at any of a plurality of different locations along the length of said bridge member during customizing of said accessory to fit said particular pair of eyeglasses.

2. The clip-on accessory of claim 1 wherein at least said one of said clasps has a passage into which an end of said bridge member extends which passage extends completely through the clasp whereby the clasp may be slid along said bridge member during assembly of said accessory to select said length of said bridge member.

3. The clip-on accessory of claim 1 wherein said first and second clasps each have an eyeglass engaging pin extending rearwardly therefrom and extending rearwardly from an adjacent end of said bridge member.

4. The clip-on accessory of claim 1 wherein said bridge member is formed of resilient material, further including a third and fourth clasp attached to edge regions of separate ones of said first and second optical elements at locations thereon which are spaced downwardly from the locations of said first and second clasps, the attachments of said third and fourth clasps to said optical elements being independent of the attachments of said first and second clasps thereto, further including four eyeglass engaging pins each of which extends rearwardly from a separate one of said clasps.

5. The clip-on accessory of claim 1 wherein said first and second clasps each have a rearwardly extending eyeglass engaging pin and each have a transverse passage of inverted U-shaped cross section, said edges of said optical elements being received in the lower portions of said passages and said ends of said bridge member being received in the upper portions of said passages.

6. The clip-on accessory of claim 5 further including hardened adhesive disposed in said passages of said first and second clasps to secure said clasps to said optical elements and to secure said ends of said bridge member to said clasps, said adhesive being of a type which is soluble by a solvent whereby said accessory may be disassembled and components thereof may be reassembled into another clip-on accessory having different proportions.

7. A clip-on accessory for holding auxiliary optical elements in front of the lenses of a pair of eyeglasses which accessory is customized to conform with a specific pair of eyeglasses of predetermined configuration, said accessory being comprised of:

a pair of optical elements each of which is superimposable on a separate one of the eyeglass lenses, said optical elements being trimmed to conform substantially with the lens regions of said specific pair of eyeglasses, a pair of upper eyeglasses securing clasps each being secured to the upper edge of a separate one of said optical elements and each having a rearwardly extending eyeglass engaging pin, each of said upper clasps having a transverse passage extending therethrough, a resilient bridge member extending between the optical elements and having opposite ends which extend into said passages of said upper clasps and which are directly secured to said upper clasps, said bridge member having a length that it adjusted during customizing of said accessory to fit said specific pair of eyeglasses in order to position said optical elements in register with said lenses of said specific pair of eyeglasses, and a pair of lower clasps each being secured to a separate one of said optical elements at locations below the locations of said upper clasps and each of which has a rearwardly extending eyeglass engaging pin.

8. A method of custom fabricating a clip-on accessory for engagement on a particular pair of eyeglasses using components that are initially adaptable to assembly of customized accessories for any of a variety of different eyeglass configurations, comprising the steps of:

preparing an outline of the lens regions of the particular pair of eyeglasses, conforming a pair of auxiliary optical elements with said outline by trimming marginal regions away from optical elements that are initially of greater extent than said lens regions, securing separate ones of a pair of eyeglass securing clasps to each of said optical elements, extending a bridge member between said pair of clasps and sliding at least one of the clasps along the bridge member to register said trimmed optical elements with said outline and to establish a selected spacing of the optical elements that corresponds to the spacing of said lens regions of said particular pair of eyeglasses, and securing said pair of clasps directly to said bridge member.

9. The method of claim 8 including the further step of cutting off any end portions of said bridge member which protrude from said clasps following securing of said clasps to said bridge member.

10. The method of claim 8 wherein a bridge member formed of resilient material is used to secure said optical elements together and wherein said pair of clasps are provided with eyeglass engaging pins that extend rearwardly therefrom at the upper edge regions of said optical elements, including the further steps of securing one of a second pair of clasps with rearwardly extending eyeglass engaging pins to each of said optical elements at locations thereon which are below said upper edge regions of said elements.

11. The method of claim 8 including utilizing a soluble adhesive to secure said clasps to said bridge member and including the further steps of adapting said accessory to another pair of eyeglasses of different configuration by dissolving said adhesive and separating components of said accessory and reassembling said components as an accessory of changed configuration.

12. The method of claim 8 including utilizing a resilient bridge member which has an upwardly bowed configuration and further including the steps of:

securing separate ones of an additional pair of eyeglasses engaging clasps to each of said optical elements at locations thereon which are below the locations of the other pair of eyeglass engaging clasps, applying pressure to said bridge member to reduce the curvature thereof while said optical elements are positioned at said selected spacing and subsequently releasing said pressure while preventing longitudinal movement of said optical elements along said bridge member whereby the lower portions of said optical elements are drawn closer together by relaxation of said resilient bridge member.

13. A method of fabricating a clip-on accessory that is customized to fit a particular pair of eyeglasses using components that are initially adaptable to assembly of accessories for eyeglasses that have any of a plurality of different configurations which method includes the steps of:

preparing an outline of the lens regions of said particular pair of eyeglasses and determining the spacing of said lens regions from each other, conforming the perimeters of a pair of auxiliary optical elements with said outline by removing marginal regions from optical elements that are initially larger than said lens regions, securing separate ones of a pair of upper eyeglass securing clasps to each of said optical elements, which upper clasps each have a transverse passage and a rearwardly extending eyeglass engaging pin, disposing opposite end portions of a resilient bridge member is said passages of said upper clasps, sliding at least one of said upper clasps along said bridge member to register said auxiliary optical elements with said outline and to space said optical elements apart a distance corresponding to said spacing of said eyeglass lens regions, and subsequently securing said upper clasps directly to said bridge member.

14. A custom fabricated clip-on accessory for engagement on a particular pair of eyeglasses, produced in accordance with the method of claim 8.

15. A kit for enabling assembly of a clip-on accessory that is custom fitted to a specific pair of eyeglasses which eyeglasses have a pair of spaced apart vision correcting lenses connected by a frame member, the components of said kit being adaptable to assembly of clip-on accessories that custom fit eyeglasses of any of a plurality of different configurations, wherein said kit includes:

a pair of auxiliary optical elements for disposition in front of the lens regions of said eyeglasses which optical elements are each of greater size than said lenses, a resilient bridge member having a length sufficient to enable variation of the spacing of said optical elements to accommodate to eyeglasses of different sizes and configurations, and at least four eyeglass securing clasps adapted to be secured to edge regions of said optical elements and at least two of said clasps being adapted to be secured to said bridge member at any of a plurality of different locations along said bridge member, each of said clasps having a rearwardly extending eyeglass engaging pin.

* * * * *